United States Patent [19]

Hudgens

[11] 4,033,020
[45] July 5, 1977

[54] METHOD OF MAKING A SLIP JOINT

[75] Inventor: Bernard C. Hudgens, West Lafayette, Ind.

[73] Assignee: TRW Inc., Cleveland, Ohio

[22] Filed: Aug. 4, 1975

[21] Appl. No.: 601,481

[52] U.S. Cl. .................. 29/149.5 NM; 29/437; 29/508; 64/23

[51] Int. Cl.² ............................... B21D 53/10

[58] Field of Search ........... 29/149.5 B, 149.5 NM, 29/149.5 C, 437, 441, 436, 508, 516, 517; 64/23

[56] References Cited

UNITED STATES PATENTS

| | | | |
|---|---|---|---|
| 1,827,267 | 10/1931 | Short | 29/517 X |
| 1,835,575 | 12/1931 | Sanders et al. | 29/436 UX |
| 2,122,839 | 7/1938 | Guy | 29/149.5 NM X |
| 3,066,503 | 12/1962 | Flemming et al. | 64/23 X |
| 3,085,312 | 4/1963 | Evans | 29/149.5 B |
| 3,126,613 | 3/1964 | Litsky | 29/149.5 B |
| 3,193,910 | 7/1965 | Evans | 29/149.5 B |
| 3,400,558 | 9/1968 | Haines | 64/23 |

Primary Examiner—Charlie T. Moon

[57] ABSTRACT

A slip joint including telescoped inner and outer members having substantially unstressed plastic material interposed therebetween. The joint is made by first telescoping inner and outer members with the plastic material interposed therebetween. The outer member is then deformed inwardly to place the plastic material under considerable compressive stress. The deformed area is then heated for expanding the plastic material and relieving the compressive stress by plastic movement of the plastic material. The plastic material is then cooled and minimal sliding clearance is provided between the inner member and the plastic material. The outer member is thus deformed inwardly in at least one localized area and the plastic material has a thickness beneath the deformed area which is substantially less than the thickness thereof beyond the deformed area.

10 Claims, 11 Drawing Figures

FIG. 1

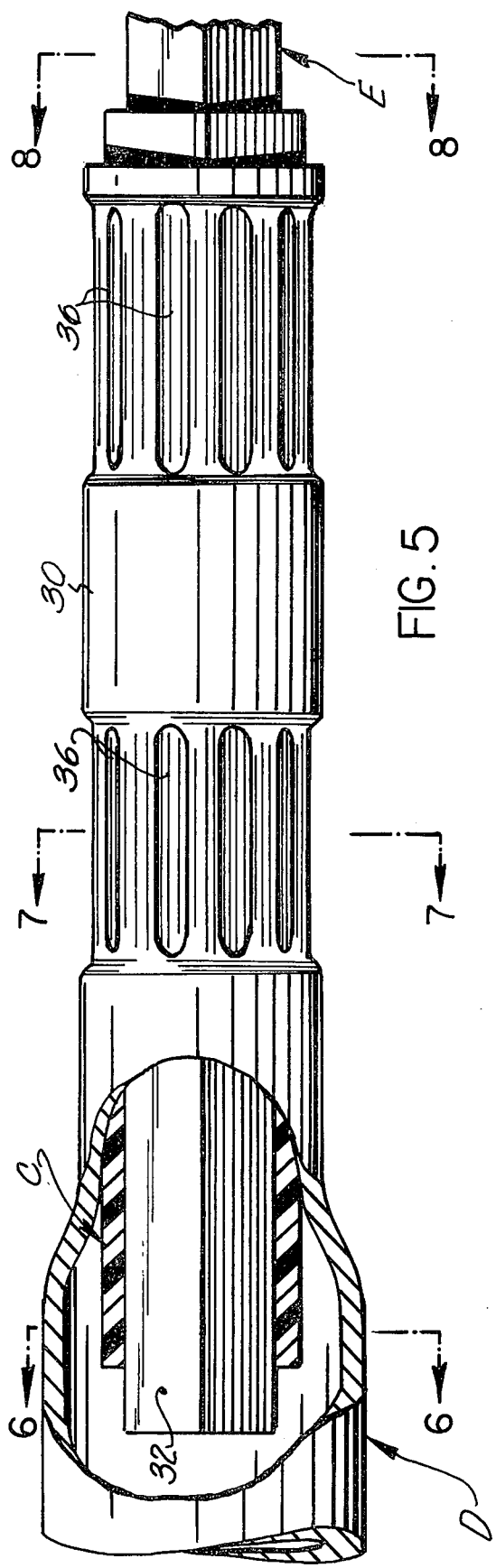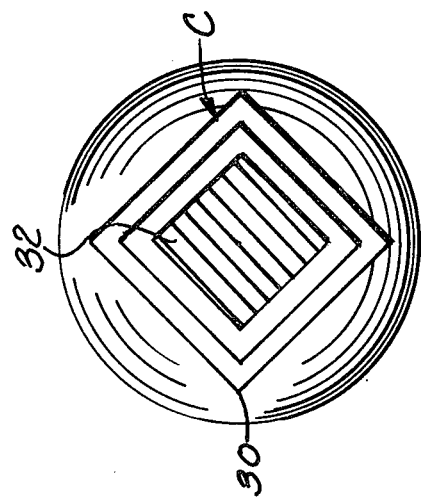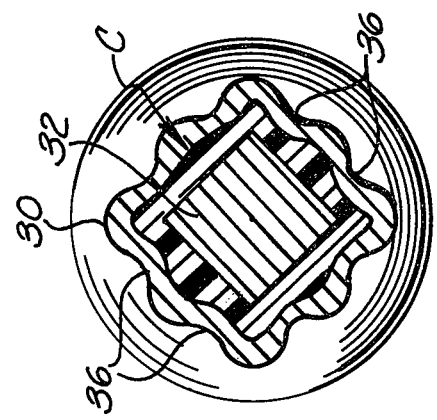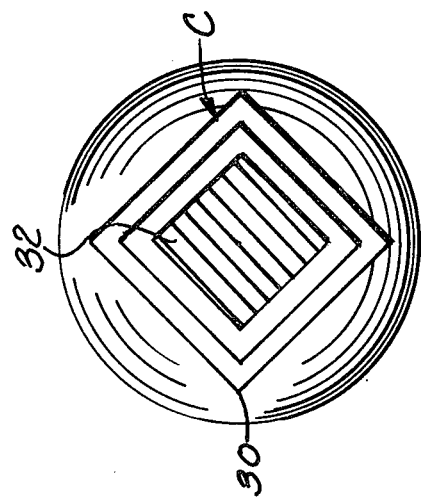

METHOD OF MAKING A SLIP JOINT

BACKGROUND OF THE INVENTION

This application pertains to the art of slip joints, and more particularly to torque couplings or to bearings.

Examples of known slip joints include those disclosed in U.S. Pat. No. 2,199,926, issued May 7, 1940 to Swennes, and U.S. Pat. No. 3,066,503, issued Dec. 4, 1962 to Fleming et al. These joints have rubber interposed between inner and outer members. The outer member is deformed at a plurality of circumferentially-spaced locations before the joint is assembled. Therefore, very close tolerances are required to provide a very close sliding fit between all the parts so that the driving connection is not sloppy. Such close tolerances are difficult to maintain and make it difficult to economically manufacture the joints. In the Swennes joint, the rubber has a uniform thickness everywhere between the inner and outer members, and is bonded to one of the members to prevent the rubber from sliding axially out of the joint. In the Fleming joint, thin metal or plastic inserts are positioned between the rubber and the inner member. Fleming discloses that the rubber is placed under compression when the joint is assembled. With the rubber under compression, there is a considerable friction force between the inserts and inner member. In both the Swennes and Fleming devices, the rubber is relatively compressible so there would be substantial loss of movement when transmitting reversible torque because it is necessary to first take up the compressibility before torque is transmitted.

U.S. Pat. No. 3,550,232, issued Dec. 29, 1970, to Burnett discloses a method for making a bearing by deforming an outer ring around a ball while plastic material between the ring and ball is in its heat-softened state. Such an arrangement would make it difficult to prevent extrusion of the plastic material from between the two members when the deformation takes place. The plastic material in Burnett is also bonded to the ring member and this requires an additional manufacturing step.

SUMMARY OF THE INVENTION

In accordance with the present invention, an improved slip joint is provided by first telescoping inner and outer members with plastic material interposed therebetween. The outer member is then deformed inwardly at selective locations to place the plastic material under substantial compressive stress beneath the deformed areas. The deformed area is then heated for expanding the plastic material and relieving the compressive stress therein by plastic movement of the plastic material. The plastic material is then cooled and the resulting joint has minimal sliding clearance between the inner member and the plastic material.

In accordance with an important aspect of the invention, the plastic material has a coefficient of thermal expansion which is substantially greater than the coefficient of thermal expansion for the materials from which the inner and outer members are formed.

The outer member is deformed over a predetermined axial length intermediate the telescoped ends of the inner and outer members, and intermediate the axial ends of the plastic material so that the plastic material is mechanically locked against relative axial and rotational sliding movement.

The inner member may have a cylindrical shape so it is slidable axially and rotatably relative to the plastic material. The inner member may also have a noncircular cross-sectional configuration so it is mechanically locked against rotation relative to the plastic material, while being axially slidable relative thereto, and the joint can thus transfer torque.

BRIEF DESCRIPTION OF THE DRAWINGS

Further features of the present invention will be apparent to those skilled in the art from the following description taken in connection with the drawings, in which:

FIG. 5 is a plan view of another slip joint, and with portions cut away for clarity of illustration;

FIG. 6 is a cross-sectional view taken generally on line 6—6 of FIG. 5;

FIG. 7 is a cross-sectional view taken generally on line 7—7 of FIG. 5;

FIG. 8 is a cross-sectional view taken generally on line 8—8 of FIG. 5;

DESCRIPTION OF PREFERRED EMBODIMENTS

Figure 1:
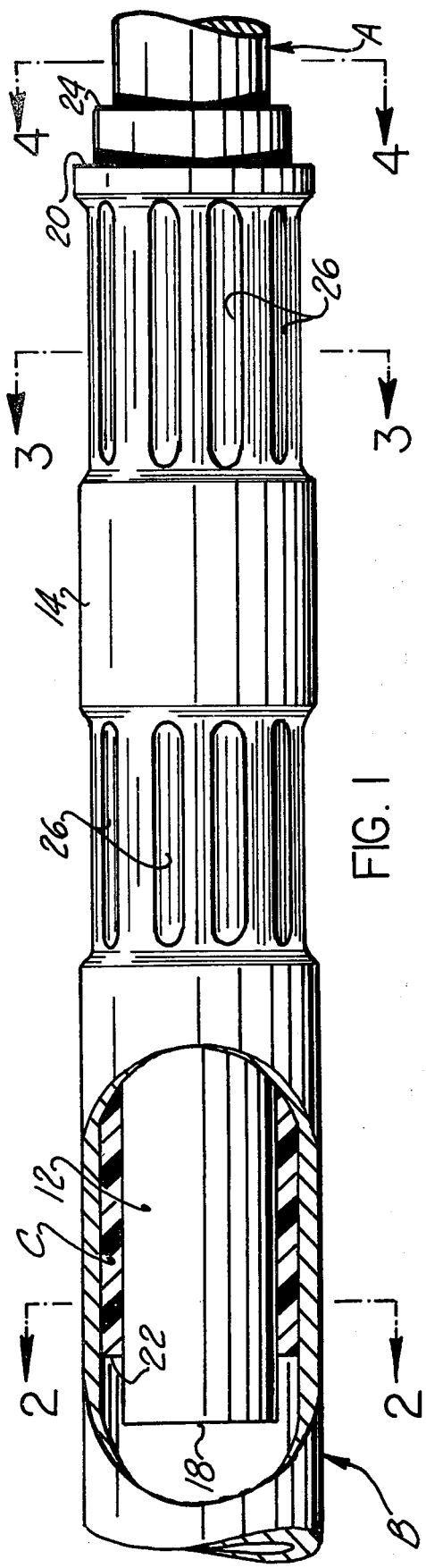
FIG. 1 is a plan view of a slip joint constructed in accordance with the present invention, and with portions cut away for clarity of illustration.
Figure 4:
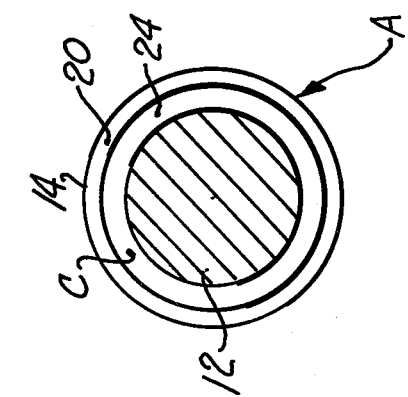
FIG. 4 is a cross-sectional view taken generally on line 4—4 of FIG. 1.

As noted above, the present invention relates to the art of slip joints or couplings in which coupling parts are relatively axially slidable. The present invention provides such a coupling which can be easily and economically manufactured. By way of example, FIG. 1 shows a coupling embodying the present invention and which includes inner and outer members A and B made of any suitable metal, such as aluminum or steel. The inner member A is a cylindrical rod having an end portion 12 telescoped within end portion 14 of member B which is a cylindrical tube. The inner and outer end portions 12 and 14 are dimensioned so that the outer surface of the inner end portion 12 is spaced radially inwardly from the inner surface of the outer end portion 14. This space is almost filled by a body of plastic in tube form, and designated C.

The inner end portion 12 and outer end portion 14 of members A and B overlap one another over a substantial length. Accordingly, the terminal end 18 of member A and the terminal end 20 of member B are spaced axially apart. The opposite axial ends 22 and 24 of the plastic tube C are located adjacent the terminal ends 18 and 20, respectively.

The inner and outer end portions 12 and 14 may be telescoped with the plastic material C positioned therebetween in many different ways. The plastic material C may be first positioned within the outer end portion 14 and the inner end portion 12 then inserted therein. The plastic material C may be positioned on the inner end portion 12 and that assembly then extended into the outer end portion 14. The inner and outer end portions 12 and 14 may be telescoped and the plastic material C then slid into the space between the end portions. For certain purposes, it is possible to use the plastic material C in the form of a longitudinally split sleeve or in the form of a plurality of separate strips which can be inserted into the space between the inner and outer end portions.

It will be recognized that it is possible to use many different types of plastic material. However, it is necessary that the plastic material have a coefficient of thermal expansion which is substantially greater than the coefficient of thermal expansion for the inner and outer members A and B. It is also desirable that the plastic material be thermoplastic because a thermosetting material will not readily undergo plastic movement at low temperatures. Suitable plastic materials include nylon and polyethylene, although it will recognized that other thermoplastic materials can also be used. Coefficients of thermal expansion used in this specification are taken from The Handbook of Chemistry and Physics, 44th Edition, 1962–1963, published by The Chemical Rubber Publishing Co., of Cleveland, Ohio. The coefficients of thermal expansion given by way of example represent the increase in length per unit length per degree centigrade.

Nylon has a coefficient of thermal expansion of around $8.3-10 \times 10^{-5}$, while polyethylene has a coefficient of thermal expansion of around $15-30 \times 10^{-5}$. More thermosetting plastics have coefficients of thermal expansion which are substantially lower than this. Aluminum alloys have coefficients of thermal expansion of around $2.1-2.6 \times 10^{-5}$. Most steels have coefficients of thermal expansion of around $1.0-1.9 \times 10^{-5}$.

Once the inner and outer end portions 12 and 14 are telescoped with the plastic material C interposed therebetween, the outer end portion 14 is deformed inwardly at a plurality of circumferentially-spaced longitudinally-extending localized areas 26. The deformed areas 26 may be formed in any suitable manner as by swaging, rolling or crimping. The deformation imparted to the outer end portion 14 is permanent and places the plastic material C under substantial compressive stress beneath each deformed area 26. The deformed areas 26 are preferably located intermediate the terminal ends 18 and 20, and extend over a predetermined deformed length of the outer end portion 14. In the arrangement shown in FIG. 1, two deformed lengths are formed in order to provide substantial bearing surface or substantial torque-transmitting capability. Providing the deformed areas intermediate the terminal ends of the inner and outer end portions, and intermediate the opposite axial ends 22 and 24 of the plastic material C, mechanically locks the plastic material C against axial and rotational movement relative to the outer end portion 14.

At this stage of manufacture, it is obvious that the inner end portion 12 is securely held by the plastic material C so that the inner end portion 12 could not move axially or rotatably relative to the plastic material C or end portion 14 unless extremely high forces were applied thereto.

Heat is next applied to the deformed areas 26 in any suitable manner as by positioning an induction heating coil around the outer end portion 14 along the deformed length, or a gas flame or conduction heating device may be used.

Heat is applied only for a sufficient time, and in sufficient amounts, for raising the temperature of the plastic material C to such a state that the compressive stress in the plastic material beneath each of the deformed areas 26 is substantially completely relieved by plastic movement of the plastic material. The temperature is not raised to the melting point, but only to a temperature which may approach that point and is preferably substantially below it.

Due to the fact that the plastic material C also has a coefficient of thermal expansion substantially greater than the inner and outer end portions 12 and 14, the plastic material C also expands outwardly and axially so that it tends to expand out of contact with the outer surface of the inner end portion 12. However, as the plastic material C expands, it tends to expand into engagement with the inner diameter of the member B. Also, as the plastic material C expands, the compressive stress is relieved by plastic movement. As a result of these actions, the plastic material flows axially beyond the deformed areas 26 so that less plastic material is left beneath the deformed areas 26 after the heating step.

When the joint and plastic material are cooled, it has been found that the plastic material C will not contract into tight engagement with the outer surface of the inner end portion 12, and a very minimal sliding radial clearance exists. This is due to the fact that less plastic material remains beneath the deformed areas. Of course, the plastic material C may lightly engage the inner end portion 12 at the deformed areas, but the plastic material is substantially completely unstressed in the final joint. The inner end portion 12 is now free to slide axially and rotatably relative to the plastic material C, while being closely supported radially. This joint may be used as a bearing and very close radial support for the inner end portion is achieved in a very economical manner, because it is not necessary to maintain extremely close tolerances on any of the members used in making the joint.

FIGS. 5–8 show another slip joint which is capable of transmitting torque in either rotary direction, while allowing axial slippage of the inner member relative to the plastic material. In this arrangement, a cylindrical tube D has an outer end portion 30 drawn or otherwise formed to have a generally square cross-sectional shape. An inner member E has an inner end portion 32 of generally square cross-sectional shape. The plastic material C may be in the form of a square tube, although it will be recognized that other shapes and individual strips can be used. Once the inner and outer end portions 32 and 30 are telescoped with the plastic material C interposed therebetween, the outer end portion 30 is provided with a plurality of permanently deformed areas 36 in the same manner as described with respect to the deformed areas 26 of FIG. 1. The outer end portion 30 is then heated in the area of the deformed areas 36 for expanding the plastic material C and receiving the compressive stress therein beneath the deformed areas 36 in the manner described above in connection with FIGS. 1–4. After heating, the assembly is cooled and it is found that the inner end portion 32 has minimal sliding clearance axially relative to the plastic material C. This arrangement is capable of transmitting torque in either rotary direction with negligible lost motion when reversing the rotary direction because there is minimal compression of the high density rigid plastic material and minimal clearance. Obviously, many other shapes may be provided for the joint.

Figure 9:
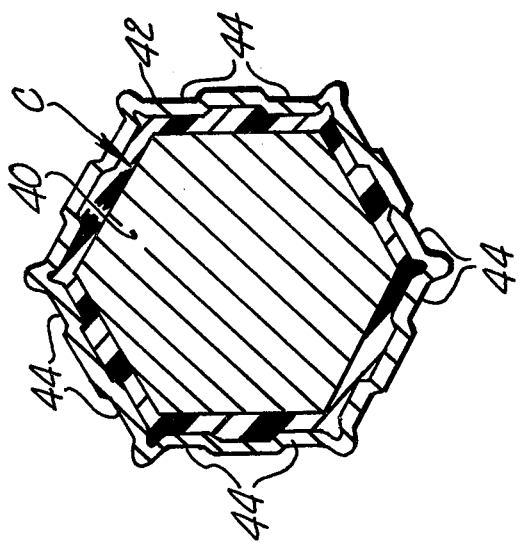
FIG. 9 is a cross-sectional view showing another embodiment.

FIG. 9 shows an arrangement wherein an inner end portion 40 has a hexagonal cross-sectional configuration cooperating with an outer end portion 42 of generally the same shape. The outer end portion 42 is deformed in a plurality of localized deformed areas 44 in the same manner previously described for the other embodiments. The steps of heating and cooling are also carried out to end up with a torque-transmitting slip joint wherein the inner end portion 40 has axial sliding clearance.

Figure 10:
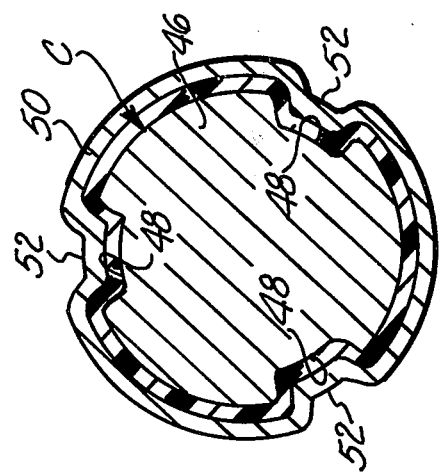
FIG. 10 is a cross-sectional view showing still another embodiment.

FIG. 10 shows another arrangement wherein an inner end portion 46 has a plurality of circumferentially-spaced axially extending recesses 48. Cylindrical outer end portion 50 is deformed inwardly as at 52 for placing the plastic material C under substantial compressive stress between the deformed areas 52 and the recesses 48. The steps of heating and cooling are carried in the same manner as previously described for providing minimal sliding clearance of the inner end portion 46 axially within the plastic material C.

In the arrangements of FIGS. 5–10, it will be recognized that the inner end portion has a noncircular cross-sectional configuration, as does the outer end portion, so that the inner and outer end portions and the plastic material are locked against rotational movement relative to one another, while the inner end portion is capable of axial sliding movement relative to the plastic material. In addition, all of the embodiments have inner and outer end portions which are substantially symmetrical about their longitudinal axes, even in the deformed areas. This is generally a preferred arrangement for the slip joints. The slip joint of the present invention can be made using standard shapes so that it is very economical to manufacture.

Figure 3:
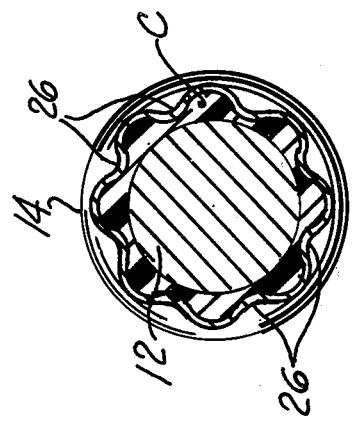
FIG. 3 is a cross-sectional view taken generally on line 3—3 of FIG. 1.
Figure 2:
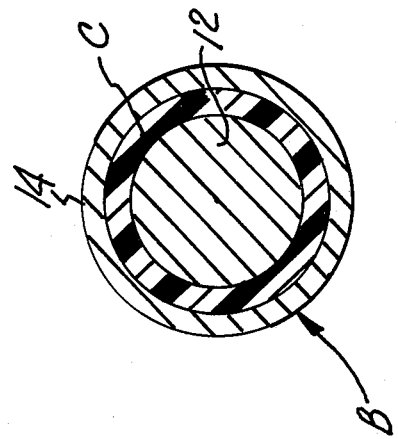
FIG. 2 is a cross-sectional view taken generally on line 2—2 of FIG. 1.
Figure 11:
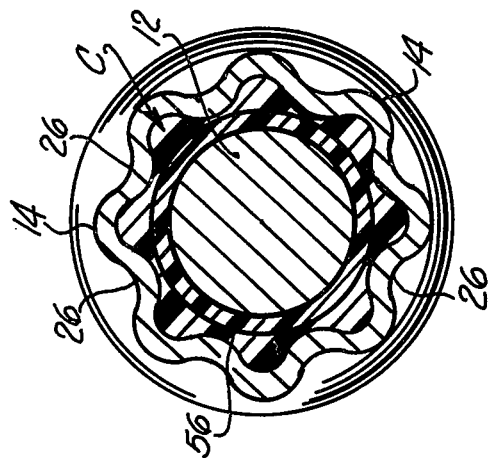
FIG. 11 is a cross-sectional view showing a further embodiment.

FIG. 11 shows another arrangement which is substantially the same as that of FIG. 3 and corresponding parts have been given corresponding numerals. The embodiment of FIG. 11 differs from that of FIG. 3 by having an extremely thin and flexible layer 56 of low friction material interposed between the inner end portion 12 and the plastic material C. The low friction material 56 may take many forms, such as a cloth of polytetrafluoroethylene or the like. The low friction material 56 could also be a different plastic material from the plastic material C where the plastic material C is chosen for its strength and load bearing and wearing properties, while the plastic for the low friction material 56 would be chosen primarily for its low friction characteristics. Interposing the low friction material 56 between the inner end portion 12 and the plastic material C can be done in many different ways. The inner end portion 12 itself can be sand-blasted and acid etched, and a thin layer of polytetrafluoroethylene or the like fused thereto. It is also possible to bond a thin layer of low friction material to the inner surface of the plastic material C before it is assembled into the joint. It is further possible to simply position a very thin layer of low friction material between the inner end portion 12 and the plastic material C when the joint is assembled. If the low friction material 56 is bonded to the inner end portion 12, the resulting joint will be one wherein both the inner end portion 12 and the low friction material 56 are capable of sliding relative to the plastic material C. Where the low friction material 56 is simply positioned between the parts, or is bonded to the interior surface of the plastic material C, the resulting joint may be one wherein the inner end portion 12 is capable of sliding relative to the low friction material 56 and the plastic material C.

Obviously, the plastic material C can be a composite of different plastics, if so desired, where an inner layer is chosen for its low friction and good wearability, while the main thickness of the plastic material is a less expensive material. The plastic material C is preferably a very rigid, high density thermoplastic material as opposed to plastics having properties similar to rubber or the like.

The plastic material C is generally very loose between the inner and outer end portions beyond the deformed areas. The improved joint and method of the present application make it possible to provide economical bearings and torque-transmitting slip couplings in a manner not heretofore possible.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A method of providing a slip joint between a pair of shafts, said method comprising providing a longitudinally extending tubular shaft, providing a second longitudinally extending shaft, positioning end portions of the shaft in a telescopic relationship with the shafts extending in opposite directions from the area of the telescopic relationship between the shafts, the second shaft being circumscribed by and spaced apart from the tubular shaft in the area of the telescopic relationship between the shafts, providing a layer of plastic material between the shafts in the area of the telescopic relationship between the shafts, locking the layer of plastic material against axial movement relative to the tubular shaft by deforming at least a portion of the tubular shaft inwardly toward the second shaft in the area of the telescopic relationship between the shafts, said step of deforming the tubular shaft including the step of pressing the layer of plastic material inwardly against the second shaft while maintaining the tubular shaft spaced from the second shaft to grip the second shaft with the layer of plastic material, and enabling the shafts to be freely moved axially relative to each other to vary the extent of the telescopic relationship between the shafts by heating to expand the layer of plastic material and then cooling to contract the layer of plastic material to provide clearance between the second shaft and the layer of plastic material due to the difference in coefficient of expansion of the second shaft and the layer of plastic material, said step of heating to expand the layer of plastic material including the step of expanding the layer of plastic material in an axial direction relative to the shaft to stress relieve said plastic layer and said step of cooling to contract the layer of plastic material including the step of contracting the layer of plastic material in a direction extending transversely to the longitudinal axes of the shafts.

2. The method of claim 1 wherein said second shaft and said tubular shaft each have a coefficient of thermal expansion substantially less than the coefficient of thermal expansion of said plastic material and said step of heating to expand the plastic material includes the step of expanding said plastic material at a rate greater than the rate of expansion of said tubular shaft thereby creating plastic movement of said plastic material.

3. The method of claim 1 wherein said step of inwardly deforming said tubular shaft is carried out by inwardly deforming said tubular shaft over a predetermined axial length intermediate the telescoped ends of said second shaft and said tubular shaft and intermediate the axial ends of said plastic material to mechanically lock said tubular shaft and said plastic material against relative axial and rotational movement.

4. The method of claim 1 wherein said second shaft has a non-circular cross-sectional shape and said step of inwardly deforming said tubular shaft includes inwardly deforming said tubular shaft to mechanically lock said plastic material and said shafts against rotation relative to one another while providing axial movement of said second shaft relative to said plastic material.

5. The method of claim 1 wherein said step of deforming said tubular shaft comprises the step of deforming said tubular shaft at a plurality of circumferentially-spaced localized areas over a predetermined length in said area of telescopic relationship so that said tubular shaft is substantially symmetrical about its longitudinal axis at said deformed area.

6. The method of claim 5 wherein said step of deforming said tubular shaft is carried out at a plurality of longitudinally-spaced deformed areas.

7. The method of claim 5 wherein said step of deforming said tubular shaft is carried out intermediate the telescoped ends of said tubular shaft and said second shaft and intermediate the axial ends of said plastic material to mechanically lock said plastic material against axial and rotational movement relative to said tubular shaft.

8. The method of claim 7 wherein said second shaft has a non-circular cross-sectional shape and is substantially symmetrical about its longitudinal axis and said steps of deforming said tubular shaft, heating to expand said deformed area and cooling to contract said plastic material are carried out to mechanically lock said second shaft against rotational movement relative to said tubular shaft while providing for relative axial movement therebetween.

9. The method of claim 1 further including the step of interposing a thin layer of low friction material between said second shaft and said low friction material relative to said plastic material.

10. The method of claim 1 further including the step of interposing a thin layer of low friction material between said second shaft and said plastic material, and said steps of deforming, heating to expand and cooling to contract being carried out to provide minimal sliding clearance of said second shaft relative to said low friction material and said plastic material.

* * * * *